US010025336B2

United States Patent
Baone et al.

(10) Patent No.: US 10,025,336 B2
(45) Date of Patent: Jul. 17, 2018

(54) SYSTEM AND METHOD FOR ANALYZING OSCILLATORY STABILITY IN ELECTRICAL POWER TRANSMISSION SYSTEMS

(71) Applicant: General Electric Company, Schenectady, NY (US)

(72) Inventors: Chaitanya Ashok Baone, Niskayuna, NY (US); Nilanjan Ray Chaudhuri, Niskayuna, NY (US); Naresh Acharya, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 896 days.

(21) Appl. No.: 14/055,667

(22) Filed: Oct. 16, 2013

(65) Prior Publication Data
US 2015/0105927 A1    Apr. 16, 2015

(51) Int. Cl.
G05F 1/66 (2006.01)
H02J 3/24 (2006.01)
H02J 3/00 (2006.01)

(52) U.S. Cl.
CPC .................. G05F 1/66 (2013.01); H02J 3/24 (2013.01); H02J 2003/001 (2013.01);
(Continued)

(58) Field of Classification Search
CPC ......... G05F 1/66; H02J 3/24; H02J 2003/001; H02J 2003/007; Y04S 40/22; Y02E 60/76
See application file for complete search history.

(56) References Cited

U.S. PATENT DOCUMENTS

| 5,594,659 A * | 1/1997 | Schlueter | H02J 3/1871 307/18 |
| 5,610,834 A * | 3/1997 | Schlueter | H02J 3/1871 323/205 |

(Continued)

FOREIGN PATENT DOCUMENTS

| JP | 2010194578 A | 9/2010 |
| JP | 2010274311 A | 12/2010 |

(Continued)

OTHER PUBLICATIONS

Berizzi, A., et al. "First and second order methods for voltage collapse assessment and security enhancement." IEEE Transactions on Power Systems 13.2 (1998): 543-551.*

(Continued)

*Primary Examiner* — M. N. Von Buhr
(74) *Attorney, Agent, or Firm* — GE Global Patent Operation; Nitin Joshi (57) ABSTRACT

A computer-based method for contingency analysis of oscillatory stability in an electrical power transmission system is provided. The method uses at least one processor. The method includes receiving, by the at least one processor, a plurality of component inputs from a plurality of system components within the electrical power transmission system. The method also includes generating a nominal matrix for the electrical power transmission system. The nominal matrix includes a set of equations at least partially modeling the electrical power transmission system. The method further includes calculating eigenvalues and eigenvectors of the nominal matrix. The method also includes identifying a contingency representing a postulated disturbance of the electrical power transmission system. The method further includes estimating a contingency eigenvalue for the con- (Continued)

tingency using the eigenvalues and eigenvectors of the nominal matrix.

15 Claims, 6 Drawing Sheets

(52) U.S. Cl.
CPC ......... *H02J 2003/007* (2013.01); *Y02E 60/76* (2013.01); *Y04S 40/22* (2013.01)

(56) References Cited

U.S. PATENT DOCUMENTS

| | | | |
|---|---|---|---|
| 5,625,751 A | | 4/1997 | Brandwajn et al. |
| 5,642,000 A | * | 6/1997 | Jean-Jumeau ........ H02J 3/1871 307/31 |
| 5,703,791 A | * | 12/1997 | Amano ................ H02J 3/24 322/20 |
| 5,719,787 A | | 2/1998 | Chiang et al. |
| 5,848,083 A | | 12/1998 | Haden et al. |
| 6,202,041 B1 | * | 3/2001 | Tse ..................... H02J 3/00 702/58 |
| 6,252,753 B1 | | 6/2001 | Bhargava |
| 6,448,983 B1 | * | 9/2002 | Ali ..................... G06F 17/50 707/999.01 |
| 6,476,521 B1 | * | 11/2002 | Lof ..................... H02J 3/24 307/102 |
| 6,496,757 B1 | | 12/2002 | Flueck et al. |
| 8,239,070 B1 | * | 8/2012 | Schlueter ............. H02J 3/00 700/286 |
| 8,788,244 B2 | * | 7/2014 | Venkatasubramanian ............................. H02J 3/18 702/57 |
| 2008/0109205 A1 | * | 5/2008 | Nasle ................ G06F 17/5009 703/18 |
| 2009/0099798 A1 | * | 4/2009 | Gong ................ H02J 3/24 702/57 |
| 2011/0191048 A1 | * | 8/2011 | Xin ................... H02J 3/24 702/75 |
| 2012/0002743 A1 | * | 1/2012 | Cavalcante ......... H04B 7/024 375/267 |
| 2012/0200166 A1 | | 8/2012 | Berggren et al. |
| 2012/0317058 A1 | | 12/2012 | Abhulimen |
| 2013/0095342 A1 | | 4/2013 | Schick et al. |
| 2013/0304266 A1 | * | 11/2013 | Giannakis .......... G01R 21/133 700/286 |
| 2015/0161298 A1 | * | 6/2015 | Meagher ............ H02J 3/38 703/18 |

FOREIGN PATENT DOCUMENTS

| | | |
|---|---|---|
| WO | 2004061462 A1 | 7/2004 |
| WO | 2013022675 A1 | 2/2013 |

OTHER PUBLICATIONS

Hamon, C., et al. "A stochastic optimal power flow problem with stability constraints—Part I: Approximating the stability boundary." IEEE Transactions on Power Systems 28.2 (2013): 1839-1848.*

Sanchez-Gasca, J.J., et al. "Inclusion of higher order terms for small-signal (modal) analysis: committee report-task force on assessing the need to include higher order terms for small-signal (modal) analysis." IEEE Transactions on Power Systems 20.4 (2005): 1886-1904.*

Cañizares, Claudio A., et al. "Linear performance indices to predict oscillatory stability problems in power systems." IEEE Transactions on Power Systems 19.2 (2004): 1104-1114.*

Gomme, Paul, and Paul Klein. "Second-order approximation of dynamic models without the use of tensors." Journal of Economic Dynamics and Control 35.4 (2011): 604-615.*

European Search Report and Written Opinion issued in connection with corresponding EP Application No. 14188530.1-1804 dated Mar. 5, 2015.

Takimoto et al.,"Contingency selection method for on-line small signal stability monitoring", Electrical Engineering in Japan, vol. No. 145, Issue No. 4, pp. 20-27, Sep. 10, 2003.

Liu et al., "Transmission grid vulnerability assessment by eigen-sensitivity and cut-set screening", Transmission and Distribution Conference and Exposition, IEEE PES, Piscataway, NJ, USA, pp. 1-8, Apr. 19, 2010.

Doan et al., "Effects of power system stabilizer on inter-area oscillation in a longitudinal power system", Solid State Circuits Conference (A-SSCC), 2012 IEEE Asian, IEEE, pp. 455-460, Nov. 12, 2012.

Yeu, Rodney H., Small Signal Analysis of Power Systems: Eigenvalue Tracking Method and Eigenvalue Estimation Contingency Screening for DSA, Doctor of Philosophy in Electrical and Computer Engineering in the Graduate College of the University of Illinois at Urbana-Champaign, 2010, pp. 1-167.

Liu, Xiaopeng, Power System Dynamic Vulnerability under Extreme Transmission Line Contingencies, Master of Engineering Dept. of Electrical and Computer Engineering McGill University, Aug. 30, 2007, pp. 1-104, Montreal, Quebec, Canada.

Nagata, Masaki, An Efficient Contingency Screening Scheme for ATC Assessment With Transient Stability Constraints, System Engineering Research Laboratory, CRIEPI, Aug. 2005, pp. 1-7, Session 14 Paper 5.

Mansour, Yakout et al., Dynamic Security Contingency Screening and Ranking Using Neural Networks, IEEE Transactions on Neural Networks, Jul. 1997, pp. 1-5, vol. 8, No. 4.

Teeuwsen, Simon P., Oscillatory Stability Assessment of Power Systems using Computational Intelligence, Mar. 23, 2005, 165 pgs, Germany.

Prasertwong, K., N. Mithulananthan, and D. Thakur. "Understanding low-frequency oscillation in power systems." International Journal of Electrical Engineering Education 47.3 (2010): 248-262.

* cited by examiner

SYSTEM AND METHOD FOR ANALYZING OSCILLATORY STABILITY IN ELECTRICAL POWER TRANSMISSION SYSTEMS

STATEMENT REGARDING FEDERALLY SPONSORED RESEARCH & DEVELOPMENT

This invention was made with U.S. Department of Energy support under contract number DE-OE0000626. The Government has certain rights in this invention.

BACKGROUND

The embodiments described herein relate generally to electrical power transmission systems and, more particularly, to systems and methods for analyzing oscillatory stability in electrical power transmission systems under the effects of a plurality of postulated fault conditions, i.e., "contingencies," that cause perturbations in the system.

Power transmission systems are subject to system perturbations during events such as, for example, line faults, changes in generation, or changes in load demand. Such changes in the system may cause stability problems for the system in many different respects, such as voltage stability, i.e., the system's ability to maintain steady voltage, frequency stability, i.e., the system's ability to maintain steady frequency, and oscillatory stability, i.e., the system's ability to maintain a steady state operating point.

To analyze small perturbations in power transmission systems with respect to oscillatory stability, some known methods create a mathematical model of the system that represents the various elements of the system. With the mathematical model, a number of contingencies are analyzed using time-domain simulations of the system under the effects of the contingencies. However, in large systems, there are a large number of possible contingencies. Time-domain analysis of each contingency is computationally intensive and not feasible in short time periods such as may be required during real-time operational management. One known general approach to contingency analysis involves "screening and ranking," in which a large number of contingencies are filtered out, and only a select few contingencies are analyzed in detail. However, to generate sufficient results by screening and ranking contingencies, the most critical contingencies must be identified for full analysis.

BRIEF DESCRIPTION

In one aspect, a computer-based method for contingency analysis of oscillatory stability in an electrical power transmission system is provided. The method uses at least one processor. The method includes receiving, by the at least one processor, a plurality of component inputs from a plurality of system components within the electrical power transmission system. The method also includes generating a nominal matrix for the electrical power transmission system. The nominal matrix includes a set of equations at least partially modeling the electrical power transmission system. The method further includes calculating eigenvalues and eigenvectors of the nominal matrix. The method also includes identifying a contingency representing a postulated disturbance of the electrical power transmission system. The method further includes estimating a contingency eigenvalue for the contingency using the eigenvalues and eigenvectors of the nominal matrix.

In a further aspect, a computer system for contingency analysis of oscillatory stability in an electrical power transmission system is provided. The system includes at least a processor and a memory. The processor is programmed to receive a plurality of component inputs from a plurality of system components within the electrical power transmission system. The processor is also programmed to generate a nominal matrix for the electrical power transmission system. The nominal matrix includes a set of equations at least partially modeling the electrical power transmission system. The processor is further programmed to calculate eigenvalues and eigenvectors of the nominal matrix. The processor is also programmed to identify a contingency representing a postulated disturbance of the electrical power transmission system. The processor is further programmed to estimate a contingency eigenvalue for the contingency using the eigenvalues and eigenvectors of the nominal matrix.

In another aspect, one or more computer-readable storage media having computer-executable instructions embodied thereon are provided. When executed by at least one processor, the computer-executable instructions cause the processor to receive a plurality of component inputs from a plurality of system components within the electrical power transmission system. The computer-executable instructions also cause the processor to generate a nominal matrix for the electrical power transmission system. The nominal matrix includes a set of equations at least partially modeling the electrical power transmission system. The computer-executable instructions further cause the processor to calculate eigenvalues and eigenvectors of the nominal matrix. The computer-executable instructions also cause the processor to identify a contingency representing a postulated disturbance of the electrical power transmission system. The computer-executable instructions further cause the processor to estimate a contingency eigenvalue for the contingency using the eigenvalues and eigenvectors of the nominal matrix.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "power system stability" is used generally to refer to a power transmission network's ability to reach a state of equilibrium after experiencing a disturbance. Also as used herein, the term "disturbance" refers to an event that may be experienced by the power transmission network that affects the equilibrium of the network. For example, load changes on the network, a circuit break in a line of the network, loss of a power generator, and a fault on the network may cause disturbances on the network. Such disturbances may cause various system stability problems such as, for example, stability with respect to voltage, frequency, and/or rotor angle. Further, as used herein, "oscillatory stability" refers to a power transmission network's ability to maintain a stable operating point after experiencing a disturbance.

Also as used herein, the term "contingency" refers to a scenario that results in change in operating condition due to sudden changes in configuration or topology of the power system, which may in turn cause a disturbance in the transmission network, and may impact oscillatory stability. For example, this disturbance may be due to large changes in load or generator or failure of a transmission component or isolation of transmission component due to the action of protection systems. The systems and methods described herein involve analyzing one or more contingencies. For example, a particular transmission line in the transmission network may be taken offline due to an event such as a lightning strike. This event may lead to oscillatory stability issues on the network. Accordingly, the example event of this one transmission line being removed from service may be referred to as a "contingency."

As used herein, the terms "eigenvalue" and "eigenvector" are used in reference to the general mathematical field of "eigenvalue decomposition," which has known applications in stability analysis of various types of systems. Generally speaking, eigenvalues and eigenvectors are used to characterize the dynamic response of a linear system. Each eigenvalue includes an associated eigenvector. As such, the eigenvectors and eigenvalues for a given matrix of equations, A, represents an eigen decomposition of A. As used herein, the term "nominal matrix" refers to this system of equations, A, and more specifically to a system of equations that models a particular electrical power transmission system at a given loading scenario. Further as used herein, the term "contingency matrix" refers to a system of equations for the transmission network adjusted with a given disturbance (i.e., a contingency). This contingency matrix is notated herein as $A_{post}$.

The systems and methods described herein include analyzing oscillatory stability in electrical power transmission systems under the effects of a plurality of disturbances that cause large perturbations in the system. More specifically, a subset of contingencies are identified, i.e., "ranked and screened," from a plurality of contingencies, and only that subset of contingencies are analyzed using the computationally intensive method of time-domain simulation. During contingency analysis, each contingency is analyzed using an estimation for the contingency's eigenvalues rather than the more complex process of calculating the actual eigenvalues. The estimation of eigenvalues is performed using a first order eigenvalue sensitivity, and in some embodiments also a second order eigenvalue sensitivity. As such, contingency analysis time is greatly reduced.

Figure 1:
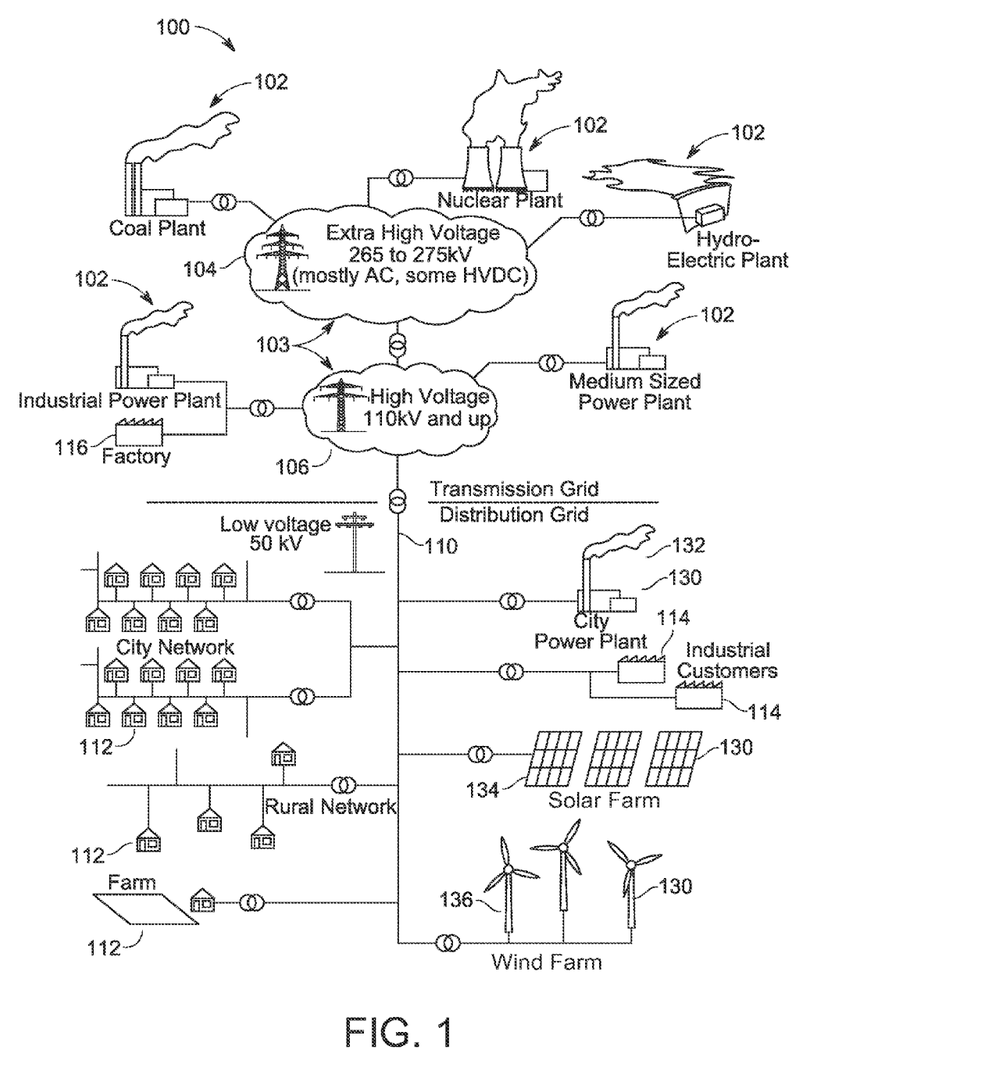
FIG. 1 is a general schematic diagram of an electrical power system including a power generation system, a power transmission system, and a power distribution system.

FIG. 1 is a general schematic diagram of an exemplary electrical power system 100 including one or more power generation systems, such as power plants 102, a power transmission system 103, and a power distribution system 110. Electrical power system 100 typically includes power plants 102 outputting power through a transmission grid 103, which includes an extra high voltage transmission grid 104 and a high voltage transmission grid 106 through which power is transmitted to an exemplary electrical power distribution system 110. Electrical power system 100 may include, without limitation, any number, type and configuration of extra high voltage transmission grids 104, high voltage transmission grids 106, and electrical power distribution systems 110, as well as any number of consumers within electrical power distribution system 110, high voltage transmission grid 106, e.g., greater than 110-265 kilovolts (kV), and extra high voltage grid 104, e.g., greater than 265 kV.

Electrical power distribution system 110 includes low wattage consumers 112 and industrial medium wattage consumers 114. Electrical power distribution system 110 also includes distributed generators 130, including a city power plant 132, a solar farm 134, and a wind farm 136. While electrical power distribution system 110 is shown with an exemplary number and type of distributed generators 130, electrical power distribution system 110 may include any number and type of distributed generators 130, including, without limitation, diesel generators, micro-turbines, solar collector arrays, photo-voltaic arrays, geo-thermal generators, and wind turbines.

Figure 2:
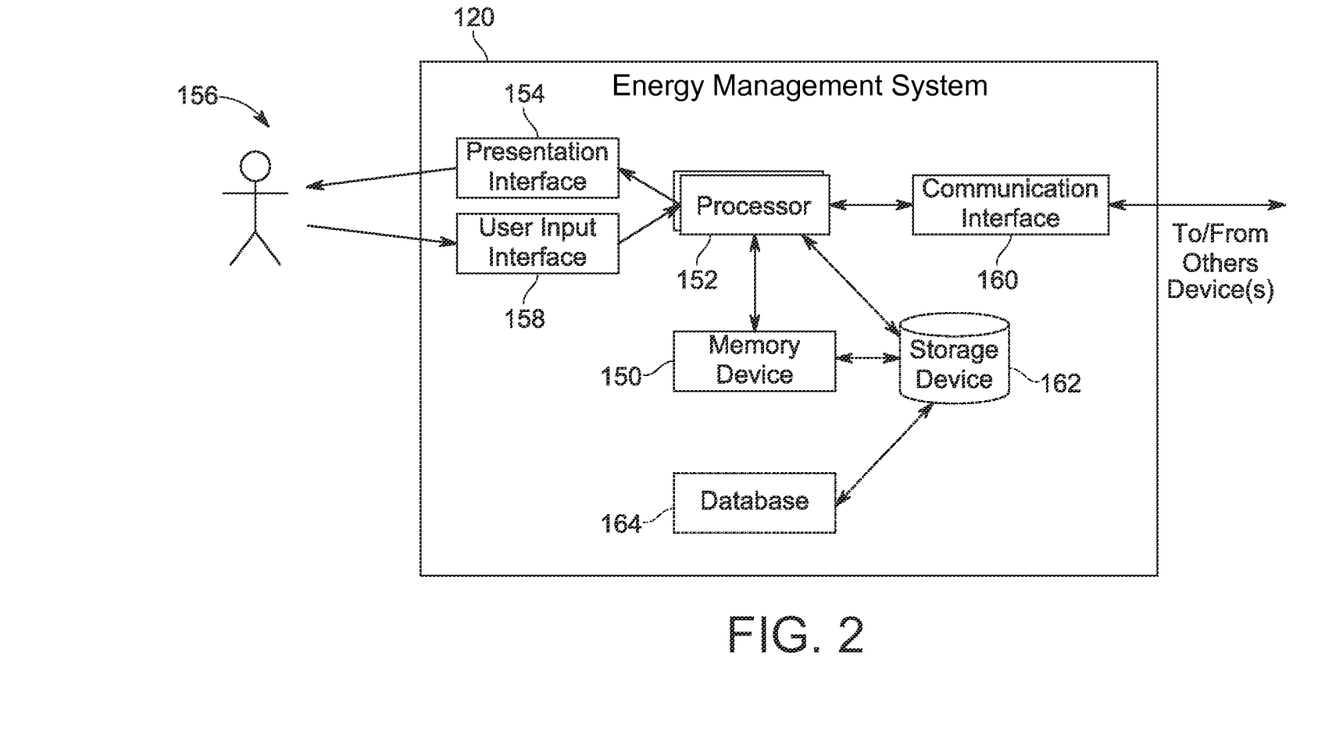
FIG. 2 is a block diagram of an exemplary computing device of an energy management system (EMS) used to analyze the electrical power distribution network shown in FIG. 1 and, more specifically, the transmission grid shown in FIG. 1.

FIG. 2 is a block diagram of an exemplary computing device 120 of an energy management system (EMS) used to analyze electrical power system 100 (shown in FIG. 1) and, more specifically, transmission grid 103 (shown in FIG. 1). Alternatively, any computer architecture that enables operation of computing device 120 as described herein may be used. Computing device 120 facilitates collecting, storing, analyzing, displaying, and transmitting data and operational commands associated with configuration, operation, monitoring and maintenance of components in transmission grid 103.

Also, in the exemplary embodiment, computing device 120 includes a memory device 150 and a processor 152 operatively coupled to memory device 150 for executing instructions. In some embodiments, executable instructions are stored in memory device 150. Computing device 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

Further, in the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 150 may be configured to store contingency scenario data and a variety of operational data associated with components of transmission grid 103.

In some embodiments, computing device 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown), e.g., an audio adapter and/or a speaker.

In some embodiments, computing device 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel, e.g., a touch pad or a touch screen. A single component, such as a touch screen, may function as both a display device of presentation interface 154 and user input interface 158.

Further, a communication interface 160 is coupled to processor 152 and is configured to be coupled in communication with one or more other devices such as, without limitation, components in transmission grid 103, another computing device 120, an energy management system (EMS) (not shown in FIG. 1), and any device capable of accessing computing device 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, a communication interface 160 of one computing device 120 may transmit transaction information to communication interface 160 of another computing device 120 and/or an EMS. Computing device 120 may be web-enabled for remote communications, for example, with a remote desktop computer (not shown).

Also, presentation interface 154 and/or communication interface 160 are both capable of providing information suitable for use with the methods described herein, e.g., to user 156 or another device. Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in computing device 120. For example, computing device 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to computing device 120 and may be accessed by a storage interface (not shown).

Moreover, in the exemplary embodiment, database 164 contains a variety of static and dynamic operational data associated with components, some of which may be transmitted from the EMS associated with components in transmission grid 103.

The embodiments illustrated and described herein as well as embodiments not specifically described herein but within the scope of aspects of the disclosure, constitute exemplary means for recording, storing, retrieving, analyzing, and displaying operational data associated with an electrical power transmission system. For example, computing device 120, and any other similar computer device added thereto or included within, when integrated together, include sufficient computer-readable storage media that is/are programmed with sufficient computer-executable instructions to execute processes and techniques with a processor as described herein. Specifically, computing device 120 and any other similar computer device added thereto or included within, when integrated together, constitute an exemplary means for recording, storing, retrieving, analyzing, and displaying operational data associated with transmission grid 103.

Figure 3:
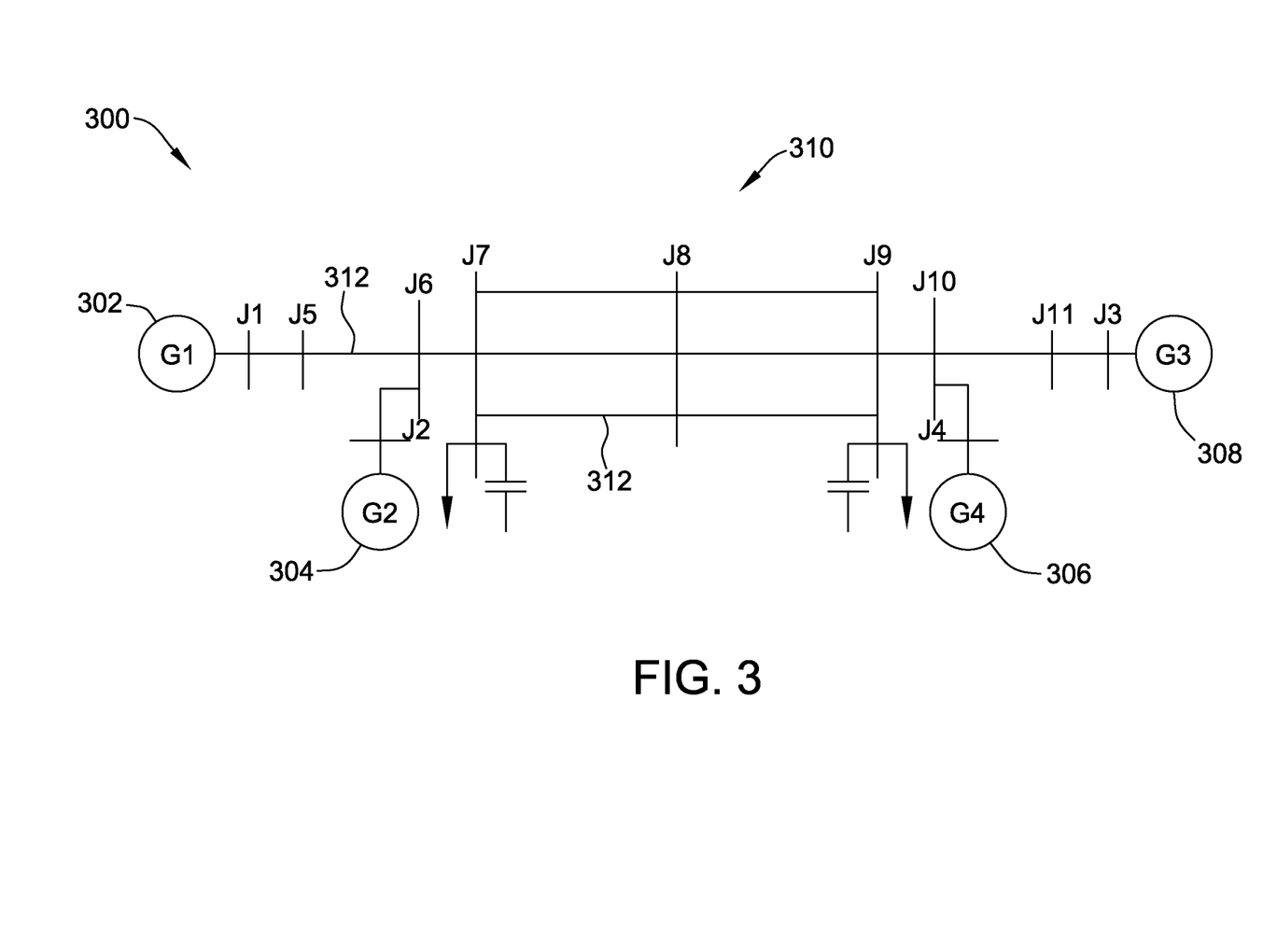
FIG. 3 is a diagram of an exemplary power transmission system within the electrical power system shown in FIG. 1.

FIG. 3 is a diagram of an exemplary power transmission system 300 within electrical power system 100 (shown in FIG. 1). In some embodiments, transmission system 300 is similar to transmission system 103 (shown in FIG. 1). In the exemplary embodiment, transmission system 300 includes four power generators 302, 304, 306, and 308, labeled "G1", "G2", "G3", and "G4", respectively. Power generators 302, 304, 306, and 308, in some embodiments, are similar to power plants 102 (shown in FIG. 1).

Transmission system 300 also includes a transmission network 310 that connects power generators 302, 304, 306, and 308 to consumers of power (not shown in FIG. 3), such as, for example, factories 116 (shown in FIG. 1) and distribution networks 110 (shown in FIG. 1). Transmission network 310 includes a series of transmission lines 312, also referred to herein as just "lines," that feed power to consumers. Transmission lines 312 come together at junctions J1-J11, also commonly referred to as "nodes" or "buses." Junctions J1-J11 may be, for example, a power substation and/or a transformer. Each line 312 is connected to two junctions, one at either end of the line. For example junction J1 is connected to junction J5 by one line. In the exemplary system, transmission system 300 includes 4 power generators 302, 304, 306, and 308 feeding power to consumers through 14 lines 312 and 11 junctions J1-J11.

Also, in the exemplary embodiment, transmission system 300 includes a computing system (not shown in FIG. 3) for monitoring and analyzing aspects of transmission system 300. More particularly, the computing system collects sample data from each junction J1-J11, and elsewhere in transmission system 300, related to measuring and analyzing oscillatory stability, such as, for example, load values on the network, power generation values from generators 302, 304, 306, and 308, and voltage angles and magnitudes at junctions J1-J11. The computing system may include an EMS and/or computing device 120 (shown in FIG. 2).

During operation, the computing system collects state data from transmission system 300 and performs analysis operations. More specifically, the computing system performs small signal stability analysis of a plurality of contingency scenarios for transmission system 300 as they relate to oscillatory stability on the network. The process for analyzing oscillatory stability is described in greater detail below. In the example embodiment, a list of contingencies includes at least 14 contingencies, each representing a failure of one of the lines 312 of transmission system 300.

Figure 4:
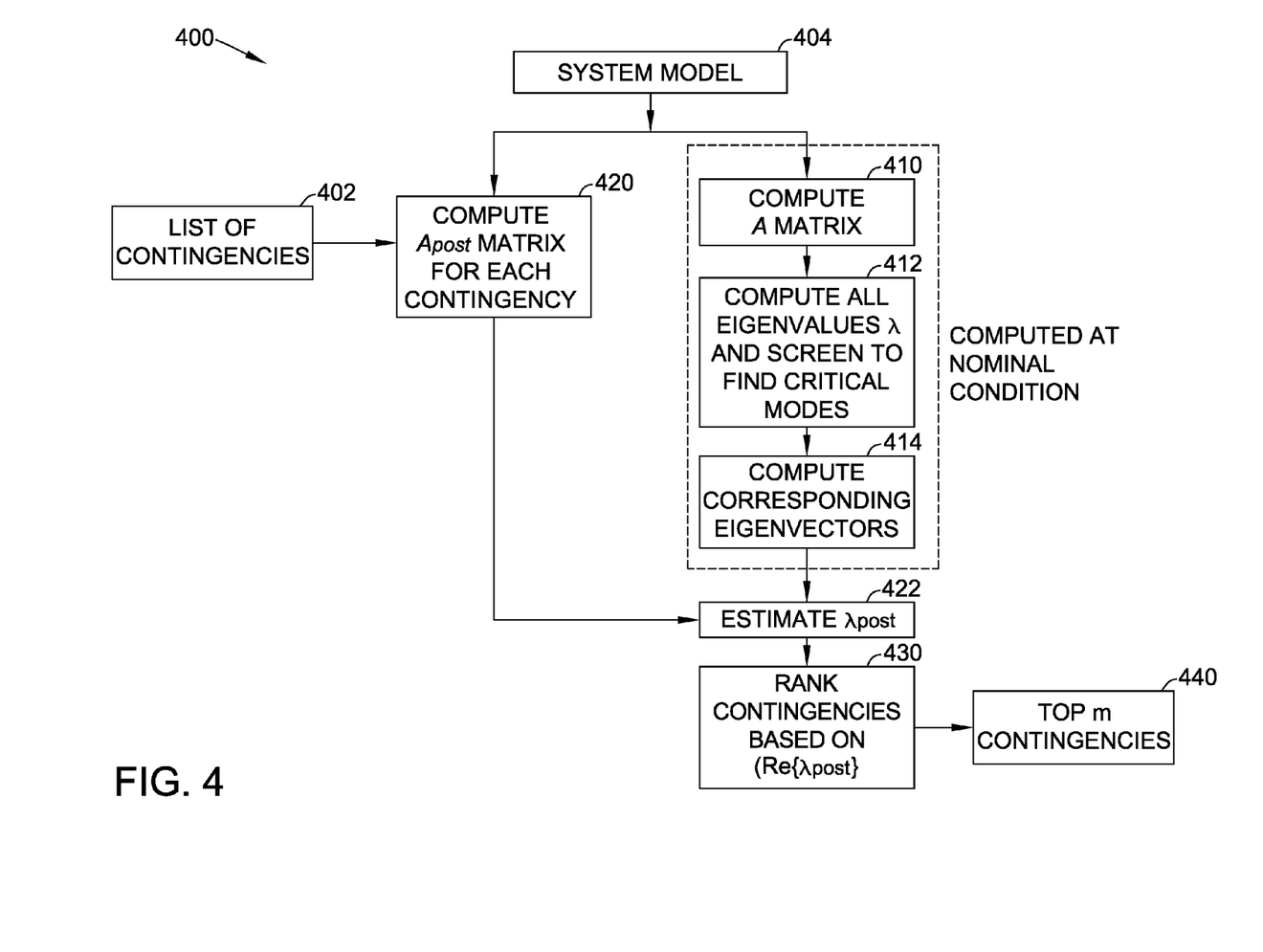
FIG. 4 is a block diagram of an exemplary process for analyzing oscillatory stability in the electrical power transmission systems shown in FIG. 3 using the computing device shown in FIG. 2.

FIG. 4 is a block diagram of an exemplary process 400 for analyzing oscillatory stability in transmission systems 300 (shown in FIG. 3) using computing device 120 (shown in FIG. 2). In the exemplary embodiment, process 400 includes identifying a list of contingencies 402 to be analyzed. List of contingencies 402 includes a plurality of scenarios that may occur to transmission system 300. In the example embodiment, as described above in reference to FIG. 3, list of contingencies 402 includes 14 contingencies. In other embodiments, such as in large transmission networks, the number of contingencies may be thousands or tens of thousands. In some known systems, contingency analysis may involve running time-domain simulations on each contingency to simulate what would happen on the network in the event of each contingency. However, in such large networks, it may be computationally infeasible to run a full time-domain simulation on thousands of contingencies due to the mathematical complexity of some of the computations. As such, process 400 seeks to select a subset of list of contingencies 402 for full time-domain simulation.

In the exemplary embodiment, process 400 identifies a mathematical system model 404 associated with the transmission system 300. Using system model 404, process 400 computes 410 a nominal matrix, $A_{sys}$, for transmission system 300. The dynamic behavior of transmission system 300 is modeled using a set of differential-algebraic equations (DAEs):

$$\dot{x} = f(x,y), \quad (1)$$

and $$0 = g(x,y). \quad (2)$$

In the exemplary embodiment, x is a vector of state variables associated with the dynamic states of generators, loads, and other system components, and y is a vector of algebraic variables associated with steady-state variables such as voltage phasor magnitudes and angles. Small signal stability analysis is performed by linearizing these non-linear equations around an operating point $(x_0, y_0)$:

$$\Delta \dot{x} = \frac{\partial f}{\partial x}\bigg|_0 \Delta x + \frac{\partial f}{\partial y}\bigg|_0 \Delta y, \quad (3)$$

and $$0 = \frac{\partial g}{\partial x}\bigg|_0 \Delta x + \frac{\partial g}{\partial x}\bigg|_0 \Delta y. \quad (4)$$

Denoting $$\frac{\partial f}{\partial x}\bigg|_0 = f_x,$$

$$\frac{\partial f}{\partial y}\bigg|_0 = f_y,$$

$$\frac{\partial g}{\partial x}\bigg|_0 = g_x,$$

and $$\frac{\partial g}{\partial y}\bigg|_0 = g_y,$$

the system eigenvalues are computed 412 by eliminating the vector of algebraic variables, so that the DAE system is reduced to a set of ordinary differential equations (ODEs):

$$\Delta \dot{x} = (f_x - f_y g_y^{-1} g_x) \Delta x = A_{sys} \Delta x. \quad (5)$$

In the example embodiment, $A_{sys}$ represents the nominal "A matrix" for the network around operating point $(x_0, y_0)$, i.e., a model built around the load flow/power flow for present loading conditions. Each row in $A_{ss}$ models a dynamic state of the system such as, for example, a rotational speed for power generator G1 302 (shown in FIG. 3), or some other time-varying quantity whose operating conditions may fluctuate based on the other states within the system. In the example embodiment, there are 4 generators, and 6 states for each generator are included, i.e., the model is a $6^{th}$ order model of transmission system 300. Accordingly, $A_{sys}$ includes 24 rows, each row having 24 columns/elements, each corresponding to a dynamic state. As such, $A_{sys}$ includes a system of equations that model transmission system 300.

The eigenvalues and eigenvectors of $A_{sys}$ are given by:

$$A_{sys}\phi_i = \lambda_i \phi_i, \quad (6)$$

and $$\psi_i A_{sys} = \lambda_i \psi_i. \quad (7)$$

In the example embodiment, process 400 computes 412 all eigenvalues of $A_{sys}$ and screens to find inter-area modes, i.e., oscillatory modes. Process 400 also computes 414 corresponding eigenvectors 414 for $A_{sys}$. As used herein, $\lambda_i$, $\phi_i$, and $\psi_i$ are the eigenvalue, right eigenvector, and left eigenvector, respectively, corresponding to mode 1. The eigenvalues of the above linear system provide the information on modal damping ratios and frequencies. Small signal stability assessment is the small-signal stability analysis of the system under a set of contingencies for a range of operating conditions. The system is considered to be small signal secure if the damping ratio of all the oscillatory modes is within a required threshold value. For the problem of inter-area oscillations, the focus is on a subset of modes in the frequency range of 0.1 Hz to 1 Hz. Oscillatory modes with damping ratio less than a threshold value, such as 0.05, are considered to be the modes of concern. Alternatively, a threshold can also be based on settling time, which is related to the real part of the eigenvalues. Oscillatory modes with settling time greater than a threshold value, such as, for example, 30 seconds, may be considered to be the modes of concern. Only those modes will be examined during contingency screening. The system matrix $A_{sys}$ changes with changes in the operating point, since it is formed based on a linearization around an operating point. The operating point changes as a result of a contingency, such as, without limitation, loss of a transmission line due to a fault.

In some embodiments, in order to analyze the impact of contingencies on small signal stability of the system, one approach is to re-compute the eigenvalues for post-contingency situations by solving equation (6). Upon solving this equation for each contingency 402, the contingencies can be ranked according to their impact on the eigenvalues. The contingencies that move the eigenvalues closest to the imaginary axis, or even move the eigenvalues to the right half of the imaginary axis, may be considered as the critical contingencies. However, for a large system, solving for eigenvalues using equation (6) for each post-contingency condition is a computationally challenging problem. This problem may be infeasible when the goal is to perform such a contingency analysis in near real-time.

In another embodiment, the approach is to perform time domain simulations for all the contingencies 402, and evaluate the change in damping or settling time of critical modes based on system identification approaches. Here again, simulating all contingencies in time domain for a large system is a time consuming process, and infeasible for near real-time applications.

In the exemplary embodiment, process 400 screens the critical contingencies for a given poorly damped mode without either solving equation (6) for each contingency 402 or simulating the computationally intensive time-domain dynamic simulations for each contingency 402. Process 400 is based on an eigenvalue sensitivity-based approach. The eigenvalue corresponding to a given critical mode is estimated based on the eigenvalues and eigenvectors at the nominal condition and change in the system matrix for each contingency. One of the advantages of the proposed algorithm is avoiding the computationally challenging task of solving equation (4) for each contingency. The 1st order eigenvalue sensitivity is given by:

$$\frac{\partial \lambda_i}{\partial \gamma} = \frac{\psi_i \frac{\partial A_{sys}}{\partial \gamma} \phi_i}{\psi_i \phi_i}. \quad (8)$$

In the example embodiment, $\gamma$ is any system parameter. Equation (8) gives information on sensitivity of the eigenvalue corresponding to mode i for a small change in the system parameter $\gamma$. Both left and right eigenvectors are used in the calculation. Multiplying both sides of equation (8) by $\Delta \gamma$ gives:

$$\frac{\partial \lambda_i}{\partial \gamma} \Delta \gamma = \frac{\psi_i \frac{\partial A_{sys}}{\partial \gamma} \Delta \gamma \phi_i}{\psi_i \phi_i}, \text{ and} \quad (9)$$

$$\approx \frac{\psi_i \Delta A_{sys} \phi_i}{\psi_i \phi_i}. \quad (10)$$

In the example embodiment, $\Delta A_{sys} = (A_{post} - A_{sys})$ is the change in the system state matrix from nominal condition to a post-contingency condition, i.e., $A_{post}$. Using Taylor series, the eigenvalue for the post-contingency condition may be estimated by:

$$\lambda_{i(post)} = \lambda_i + \left.\frac{\partial \lambda_i}{\partial \gamma}\right|_0 \Delta \gamma + \frac{1}{2!} \left.\frac{\partial^2 \lambda_i}{\partial \gamma^2}\right|_0 (\Delta \gamma)^2 + \ldots \quad (11)$$

Considering just the $1^{st}$ order term, $$\lambda_{i(post)} \approx \lambda_i + \left.\frac{\partial \lambda_i}{\partial \gamma}\right|_0 \Delta \gamma, \quad (12)$$

and thus:

$$\lambda_{i(post)}^{1st} \approx \lambda_i + \frac{\psi_i \Delta A_{sys} \phi_i}{\psi_i \phi_i}. \quad (13)$$

In the example embodiment, process 400 computes 420 an estimate for the post-contingency eigenvalue for each contingency 401. Equation (13) gives the estimate of the post-contingency eigenvalue. The only term in equation (13) dependent on the post-contingency condition is $\Delta A_{sys}$. All the other terms are computed only once, i.e., at the nominal condition. Since $\Delta A_{sys}$ is computed using both nominal condition and post-contingency condition, the change in operating condition due to a contingency is taken care of in the estimation algorithm, without needing to re-compute the eigenvalue using equation (6). So, although the estimation of eigenvalue is based on a first order approximation, the post-contingency condition is accounted for through the $\Delta A_{sys}$ term.

While equation (13) takes into account the change in operating condition as a result of a contingency, equation (13) may have certain inaccuracy in predicting the eigenvalue due to the underlying first order approximation. To improve the accuracy in this regard, in some embodiments, process 400 includes evaluating the second order term. As such, the estimate of eigenvalue is given by:

$$\lambda_{i(post)} \approx \lambda_i + \frac{\partial \lambda_i}{\partial \gamma}\bigg|_0 \Delta\gamma + \frac{1}{2!}\frac{\partial^2 \lambda_i}{\partial \gamma^2}\bigg|_0 (\Delta\gamma)^2. \quad (15)$$

The second order term in the above equation is:

$$\frac{\partial^2 \lambda_i}{\partial \gamma^2} = \frac{1}{\psi_i \phi_i}\left[\psi_i \frac{\partial^2 A_{sys}}{\partial^2 \gamma}\phi_i + 2\psi_i \frac{\partial A_{sys}}{\partial \gamma}\sum_{\substack{k=1 \\ \neq i}}^{n}\left\{\frac{\psi_k \frac{\partial A_{sys}}{\partial \gamma}\phi_i \phi_k}{\psi_k \phi_k(\lambda_i - \lambda_k)}\right\}\right]. \quad (16)$$

Similar to the approximation done for the $1^{st}$ order estimate in equation (10):

$$\frac{\partial^2 \lambda_i}{\partial \gamma^2}(\Delta\gamma)^2 \approx \frac{1}{\psi_i \phi_i}\left[2\psi_i \frac{\partial A_{sys}}{\partial \gamma}\Delta\gamma \sum_{\substack{k=1 \\ \neq i}}^{n}\left\{\frac{\psi_k \frac{\partial A_{sys}}{\partial \gamma}\Delta\gamma \phi_i \phi_k}{\psi_k \phi_k(\lambda_i - \lambda_k)}\right\}\right] \quad (17)$$

$$\approx \frac{1}{\psi_i \phi_i}\left[2\psi_i \Delta A_{sys} \sum_{\substack{k=1 \\ \neq i}}^{n}\left\{\frac{\psi_k \Delta A_{sys}\phi_i \phi_k}{\psi_k \phi_k(\lambda_i - \lambda_k)}\right\}\right].$$

Thus, in the exemplary embodiment, the estimate of the eigenvalue including the second order term is:

$$\lambda_{i(post)}^{2nd} \approx \lambda_i + \frac{\psi_i \Delta A_{sys}\phi_i}{\psi_i \phi_i} + \frac{1}{\psi_i \phi_i}\left[\psi_i \Delta A_{sys}\sum_{\substack{k=1 \\ \neq i}}^{n}\left\{\frac{\psi_k \Delta A_{sys}\phi_i \phi_k}{\psi_k \phi_k(\lambda_i - \lambda_k)}\right\}\right]. \quad (18)$$

The second order approximation in equation (18) uses information on all the eigenvalues and left and right eigenvectors computed at the nominal condition in order to estimate the eigenvalue for mode 1. The first order approximation in equation (13), however, requires only the eigenvalue and eigenvector corresponding to that particular mode. Hence, there is a tradeoff between accuracy and computation when the eigenvalue is estimated using a higher order approximation as compared to a first order approximation.

In some embodiments, in order to avoid computation of all eigenvectors, process 400 may use only eigenvalue and eigenvector corresponding to the given mode. Thus, the second order term is given by:

$$\frac{\partial^2 \lambda_i}{\partial \gamma^2} = \frac{1}{\psi_i \phi_i}\left[\psi_i \frac{\partial^2 A_{sys}}{\partial \gamma^2}\phi_i + 2\psi_i\left\{\frac{\partial A_{sys}}{\partial \gamma} - \frac{\partial \lambda_i}{\partial \gamma}I\right\}\frac{\partial \phi_i}{\partial \gamma}\right]. \quad (19)$$

Multiplying both sides of equation (19) by $(\Delta\gamma)^2$ gives:

$$\frac{\partial^2 \lambda_i}{\partial \gamma^2}(\Delta\gamma)^2 \approx \frac{1}{\psi_i \phi_i}\left[2\psi_i\left\{\frac{\partial A_{sys}}{\partial \gamma}\Delta\gamma - \frac{\partial \lambda_i}{\partial \gamma}(\Delta\gamma)I\right\}\frac{\partial \phi_i}{\partial \gamma}(\Delta\gamma)\right] \quad (20)$$

$$\approx \frac{1}{\psi_i \phi_i}\left[2\psi_i\{\Delta A_{sys} - \Delta\lambda_i^{1st}I\}\frac{\partial \phi_i}{\partial \gamma}\Delta\gamma\right],$$

where $\Delta\lambda_i^{1st}$ is given by equation (10). The eigenvector sensitivity $$\frac{\partial \phi_i}{\partial \gamma}$$

may be computed by solving the linear equation:

$$\begin{bmatrix} A_{sys} - \text{Re}(\lambda_i I) & \text{Im}(\lambda_i I) \\ -\text{Im}(\lambda_i I) & A_{sys} - \text{Re}(\lambda_i I) \\ \text{Re}(\phi_i^*) & \text{Im}(\phi_i^*) \end{bmatrix}\begin{bmatrix}\text{Re}\left(\frac{\partial \phi_i}{\partial \gamma}\right) \\ \text{Im}\left(\frac{\partial \phi_i}{\partial \gamma}\right)\end{bmatrix} = \begin{bmatrix} -\text{Re}\left(\frac{\partial A_{sys}}{\partial \gamma} - \frac{\partial \lambda_i}{\partial \gamma}I\right)\phi_i \\ -\text{Im}\left(\frac{\partial A_{sys}}{\partial \gamma} - \frac{\partial \lambda_i}{\partial \gamma}I\right)\phi_i \\ 0 \end{bmatrix}. \quad (21)$$

Multiplying both sides of equation (21) by $\Delta\gamma$ gives:

$$\begin{bmatrix} A_{sys} - \text{Re}(\lambda_i I) & \text{Im}(\lambda_i I) \\ -\text{Im}(\lambda_i I) & A_{sys} - \text{Re}(\lambda_i I) \\ \text{Re}(\phi_i^*) & \text{Im}(\phi_i^*) \end{bmatrix}\begin{bmatrix}\text{Re}\left(\frac{\partial \phi_i}{\partial \gamma}\right)\Delta\gamma \\ \text{Im}\left(\frac{\partial \phi_i}{\partial \gamma}\right)\Delta\gamma\end{bmatrix} = \begin{bmatrix} -\text{Re}\left(\Delta A_{sys} - \Delta\lambda_i^{1st}I\right)\phi_i \\ -\text{Im}\left(\Delta A_{sys} - \Delta\lambda_i^{1st}I\right)\phi_i \\ 0 \end{bmatrix}, \quad (22)$$

where $\phi_i^*$ represents a complex conjugate transpose of the eigenvector

Although the proposed algorithm requires the computation of A matrices corresponding to all the contingencies, this process is easily parallelizable, and so high performance computing (HPC) can be used to speed up this computation. Computation of A matrix involves perturbing each of the dynamic states and computing the resulting changes in system states. This computation can be reduced by identifying the states that have the majority of impact on a given critical mode. This information is obtained by computing the participation factors for the given mode. The participation factor (PF) is a scalar quantity that provides a measure of the association between the state variables and the mode, and is given by:

$$PF_{ki} = \phi_{ki}\psi_{ik}, \quad (23)$$

where k denotes the mode of interest and i denotes the state. As illustrated by the above equation, the participation factor may be computed using the left and right eigenvector corresponding to that mode for the nominal matrix. In view of the eigenvector normalization, the sum of participation factors associated with any mode is equal to approximately 1. After the participation factor is calculated for each of the states for a given mode, a sorted list of states is formed according to descending order of the participation factors. The states that contribute to a majority of the participation in that mode are chosen based on a pre-defined threshold value for the cumulative sum of participation factors in the sorted list, for example 0.95.

Hence, instead of perturbing all the states of the system, in the example embodiment, only those states that have significant participation in a given mode are perturbed. The remaining states are held constant at their nominal values, since their perturbation does not have a significant impact on the mode. This process improves the speed of computation of A matrix for each contingency.

In the example embodiment, the ranking is based on the contingency stability value. In one embodiment, the list of contingencies may be sorted according to the real part of estimated eigenvalues. This sorting is based on descending order. Larger values of the real part indicates higher ranking, i.e., more severe of a contingency. In another embodiment, the list of contingencies is sorted based on a damping ratio estimation. This sorting is based on ascending order. Smaller value of damping ratio indicates higher ranking, i.e., more severe of a contingency). After ranking the contingencies, the screening of critical contingencies is performed based on user configurable contingency stability threshold value. In one embodiment, a threshold value of 5% is used on the damping ratio estimation. Contingencies less than 5% damping ratio are screened to be critical and are used for further analysis using time domain simulation. In another embodiment, a threshold value of −0.133 for the real part of eigenvalue is used (which corresponds to 30 second settling time). Contingencies resulting in real part greater than this value are screened to be critical.

Referring again to FIG. 4, in the exemplary embodiment, process 400 computed 412 the eigenvalues for the nominal matrix, and estimated 422 eigenvalues for each of the contingencies 402 based on a change in the nominal matrix at a nominal operating point, as described above. Process 400 then ranks 430 all of the contingencies 402 based on their influence on the critical modes of interest. The contingencies are sorted in descending order based on the real part of the eigenvalues. The ranking examines the difference between the real portions of the eigenvalues of interest and the corresponding eigenvalues in the nominal matrix, i.e., their contingency stability values.

In the example embodiment, the top 10 contingencies are selected 440. Process 400 then runs full time-domain simulations on those selected contingencies. The results of these full simulations are then sent on to a control action engine and/or a human operator for operational action. In some embodiments, a time-domain simulation is performed on the contingency if the contingency stability value is greater than a pre-determined threshold value. Example actions that the control action engine or the system operator may take based on analysis include re-dispatching some of the generation sources and/or loads in the system in order to improve the oscillatory stability across the identified critical contingency scenarios.

In some embodiments, certain operations of process 400, such as computations associated with estimations of contingency eigenvalues, may be distributed to multiple computing devices 120, such as in a clustered computing setting using parallel processing.

Figure 5:
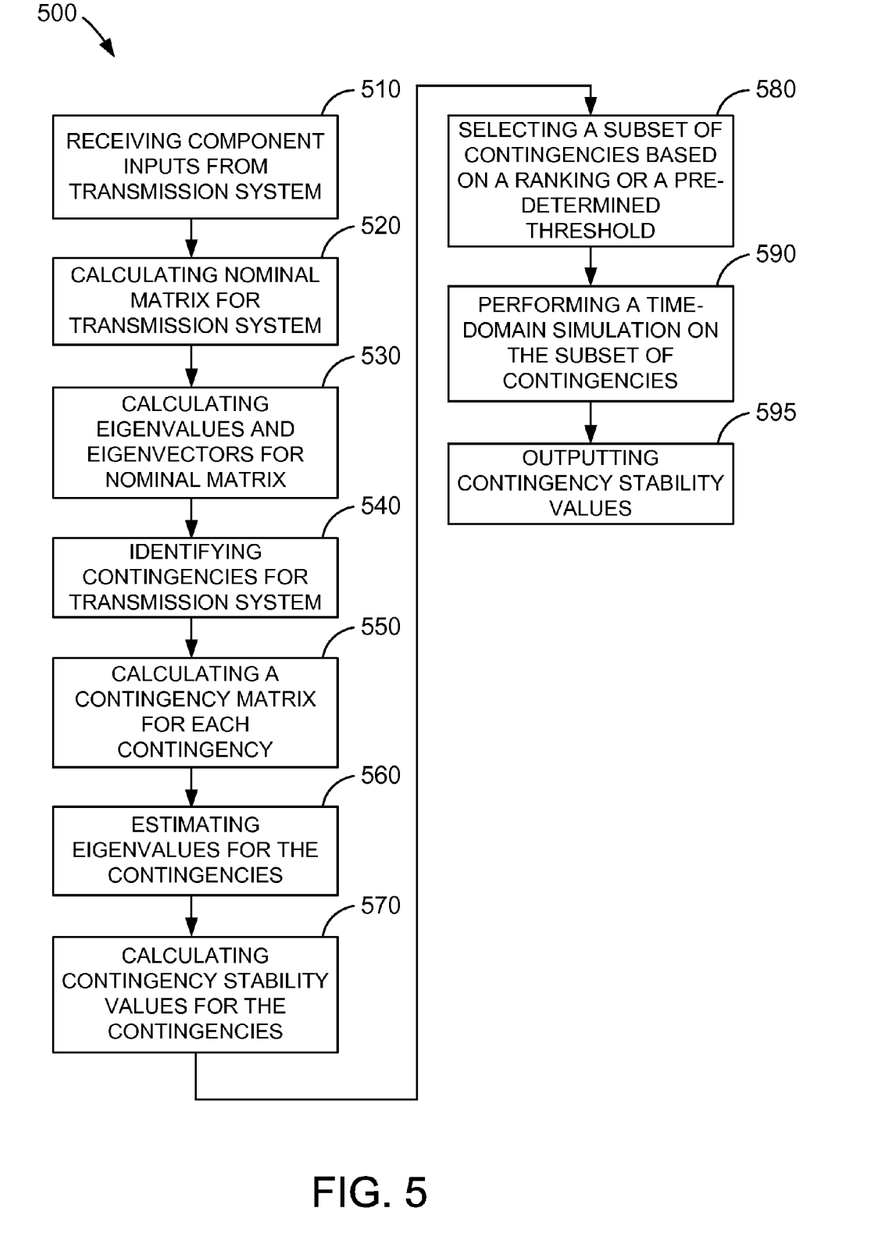
FIG. 5 is a flow chart of an exemplary method for analyzing oscillatory stability in the electrical power transmission systems shown in FIG. 3 using the computing device shown in FIG. 2.

FIG. 5 is a flow chart of an exemplary method 500 for analyzing oscillatory stability in transmission system 300 (shown in FIG. 3) using computing device 120 (shown in FIG. 2). In the exemplary embodiment, method 500 includes receiving 510 a plurality of component inputs from a plurality of system components within transmission system 300. Method 500 also includes calculating 520 a nominal matrix for the electrical power transmission system using at least the plurality of component inputs. The nominal matrix includes a set of equations modeling transmission system 300. Method 500 further includes calculating 530 eigenvalues and eigenvectors for the nominal matrix. Each eigenvalue has a real part and an imaginary part, where the real part represents a settling time of an oscillation within transmission system 300.

Also, in the exemplary embodiment, method 500 includes identifying 540 one or more contingencies, such as list of contingencies 402 (shown in FIG. 4), associated with transmission system 130. Each contingency represents a postulated disturbance which the electrical power transmission system may experience. Method 500 further includes calculating 550 a contingency matrix for each contingency. The contingency matrix includes a set of equations modeling the electrical power transmission system after the contingency has occurred, i.e., post-contingency. Method 500 also includes estimating 560 a contingency eigenvalue for the contingency using the eigenvalues and eigenvectors from the nominal matrix. In some embodiments, the change matrix is also used. Method 500 further includes calculating 570 a contingency stability value. The contingency stability value represents an approximation of the oscillatory stability of the electrical power transmission system after the contingency. Method 500 also includes outputting 595 the contingency stability value.

Further, in some embodiments, method 500 includes estimating a contingency eigenvalue using at least a first-order approximation of a Taylor series expansion. In some embodiments, method 500 also includes using at least a second-order approximation of a Taylor series expansion. Also, in some embodiments, method 500 includes performing 590 a time-domain simulation on one or more contingencies if the contingency stability values is greater than a pre-determined threshold. And in other embodiments, method 500 includes identifying a plurality of contingencies, calculating a contingency stability value for each contingency of the plurality of contingencies, thereby generating a plurality of contingency stability values, selecting a subset of contingencies from the plurality of contingencies based at least in part on the plurality of contingency stability values, and performing a time-domain simulation on each contingency of the subset of contingencies.

Figure 6:
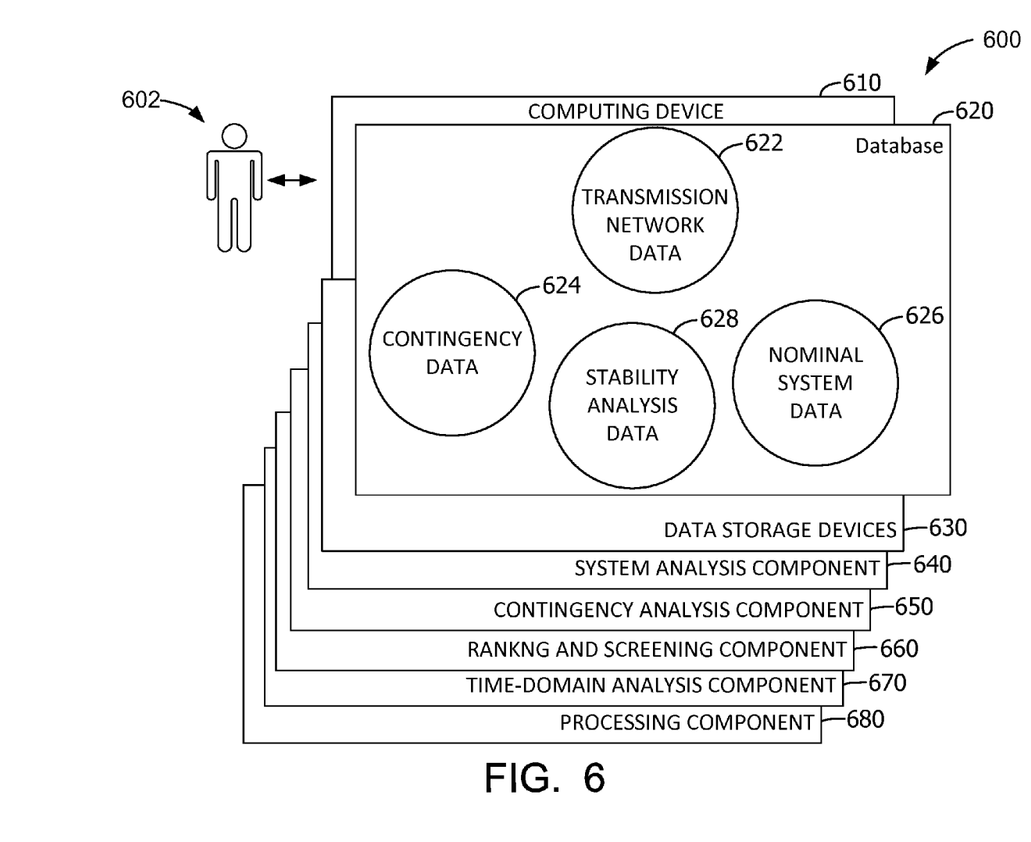
FIG. 6 illustrates an example configuration of a database within a computing device, along with other related computing components, that may be used during analysis and operations on the data streams as described herein.

FIG. 6 illustrates an example configuration 600 of a database 620 within a computing device 610, along with other related computing components, that may be used during analysis and operations on the data streams as described herein. Database 620 is coupled to several separate components within computing device 610, which perform specific tasks. In the example embodiment, computing device 610 may be computing device 120 (shown in FIG. 2).

In the example embodiment, database 620 includes transmission network data 622, contingency data 624, nominal system data 626, and stability analysis data 628. Transmission network data 622 includes information associated with an electrical power transmission network such as transmission system 300 (shown in FIG. 3). Contingency data 624 includes information associated with contingency scenarios such as list of contingencies 402 (shown in FIG. 4). Nominal system data 626 includes information associated with the nominal matrix for transmission system 300 computed during practice of method 400 as described in reference to FIG. 4. Stability analysis data 628 includes information associated with computations made during practice of method 400 as described in reference to FIG. 4.

Computing device 610 includes the database 620, as well as data storage devices 630. Computing device 610 also includes a system analysis component 640 for receiving transmission network data 622 and building the nominal matrix stored in nominal system data 626. Computing device 610 also includes a contingency analysis component 650 for analyzing contingency data 624. A ranking and screening component 660 is also included for performing analysis steps after contingencies have been processed. Further, computing device 610 includes a time-domain analysis component 670 for executing full time-domain simulations on the screened contingencies and interacting with control action engine 450 (shown in FIG. 4). A processing component 680 assists with execution of computer-executable instructions associated with the system.

The above-described systems and methods provide a way to estimate eigenvalues for contingencies during analysis of oscillatory stability in an electrical power transmission system. Oscillatory stability analysis systems are traditionally implemented in brute force ways that require repeated, computationally intensive computing operations that may be infeasible for large power networks. The embodiments described herein allow for estimating eigenvalues for contingency scenarios. The use of an estimate circumvents the computationally intensive step of calculating the actual eigenvalues of contingency scenarios.

An exemplary technical effect of the methods, systems, and apparatus described herein includes at least one of: (a) reducing overall computational processing time for oscillatory stability analysis; (b) facilitating a process for ranking contingencies during oscillatory stability analysis; (c) facilitating a process for selecting, i.e., "screening," a small subset of contingencies for more detailed analysis based on the ranking; (d) improving performance of contingency selection, i.e., selecting the more critical contingencies to analyze in detail; (e) improving the feasibility of processing contingency analysis in closer to real time; (f) obtaining a better understanding of the operation of the system in near real-time in the event of such contingencies, i.e., dynamic security assessment in real-time; and (g) enabling re-dispatching some of the generation sources and/or loads in the system in order to improve the oscillatory stability across the identified critical contingency scenarios.

Exemplary embodiments of systems and methods for analyzing oscillatory stability in transmissions systems are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring concept extraction systems and methods, and are not limited to practice with only the text processing system and concept extraction system and methods as described herein. Rather, the exemplary embodiments can be implemented and utilized in connection with many other concept extraction applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method for improving oscillatory stability in an electrical power transmission system, said method using at least one processor, said method comprising:

receiving, by the at least one processor, a plurality of component inputs from a plurality of system components within the electrical power transmission system;

generating a nominal matrix for the electrical power transmission system, wherein the nominal matrix includes a set of equations at least partially modeling the electrical power transmission system;

calculating eigenvalues and eigenvectors of the nominal matrix;

identifying a contingency representing a postulated disturbance of the electrical power transmission system;

estimating a contingency eigenvalue for the contingency using the eigenvalues and eigenvectors of the nominal matrix;

performing a time-domain simulation on the contingency if a contingency stability value is greater than a predetermined threshold value;

adjusting a plurality of generation sources or loads or both in the electrical power transmission system based on the results of the time-domain simulation for improving the oscillatory stability;

wherein estimating the contingency eigenvalue comprises using a first-order approximation of a Taylor series expansion when a faster computation is required and using a second-order approximation of a Taylor series expansion when higher accuracy is required; and wherein when the first-order approximation is used, the contingency eigenvalue is given by $$\lambda_{i(post)}^{1st} \approx \lambda_i + \frac{\psi_i \Delta A_{sys} \phi_i}{\psi_i \phi_i}$$

where $\lambda_{i(post)}^{1st}$ is the contingency eigenvalue, $\lambda_i$, $\phi_i$, and $\psi_i$ are the eigenvalue, right eigenvector, and left eigenvector, respectively, corresponding to mode i and $A_{sys}$ is the nominal matrix.

2. The method in accordance with claim 1 further comprising:

calculating a first set of eigenvalues and a first set of eigenvectors for the nominal matrix, each eigenvalue having a real part and an imaginary part, each real part representing a settling time of an oscillation within the electrical power transmission system;

calculating a contingency matrix for the contingency, the contingency matrix including coefficients of a set of equations modeling the electrical power transmission system after the contingency, wherein estimating a contingency eigenvalue for the contingency further comprises using the contingency matrix;

calculating the contingency stability value using the contingency matrix and the nominal matrix, the contingency stability value representing an approximation of the oscillatory stability of the electrical power transmission system after the contingency; and outputting the contingency stability value.

3. The method in accordance with claim 2, further comprising:
calculating a participation factor for each state of a plurality of states associated with the nominal matrix; and
selecting a first set of states from the plurality of states based at least in part on the participation factor of each state, wherein calculating a contingency matrix further comprises perturbating only the first set of states.

4. The method in accordance with claim 2 further comprising:
identifying a plurality of contingencies;
calculating the contingency stability value for each contingency of the plurality of contingencies, thereby generating a plurality of contingency stability values;
selecting a subset of contingencies from the plurality of contingencies based at least in part on the plurality of contingency stability values; and
performing the time-domain simulation on each contingency of the subset of contingencies.

5. The method in accordance with claim 4 further comprising ranking the plurality of contingencies based at least in part on the plurality of contingency stability values, wherein selecting a subset of contingencies further comprises screening the plurality of contingencies based at least in part on a pre-defined contingency stability threshold value.

6. The method in accordance with claim 1, wherein when the second-order approximation is used, the contingency eigenvalue is given by $$\lambda_{i(post)}^{2nd} \approx \lambda_i + \frac{\psi_i \Delta A_{sys} \phi_i}{\psi_i \phi_i} + \frac{1}{\psi_i \phi_i}\left[\psi_i \Delta A_{sys} \sum_{\substack{k=1 \\ \neq i}}^{n}\left\{\frac{\psi_k \Delta A_{sys} \phi_i \phi_k}{\psi_k \phi_k (\lambda_i - \lambda_k)}\right\}\right]$$

where $\lambda_{i(post)}^{2nd}$ is the contingency eigenvalue, $\lambda_i$, $\phi_i$, and $\psi_i$ are the eigenvalue, right eigenvector, and left eigenvector, respectively, corresponding to mode i and $A_{sys}$ is the nominal matrix.

7. A computer system for improving oscillatory stability in an electrical power transmission system, the system comprising at least a processor and a memory, the processor programmed to:
receive a plurality of component inputs from a plurality of system components within the electrical power transmission system;
generate a nominal matrix for the electrical power transmission system, wherein the nominal matrix includes a set of equations at least partially modeling the electrical power transmission system;
calculate eigenvalues and eigenvectors of the nominal matrix;
identify a contingency representing a postulated disturbance of the electrical power transmission system;
estimate a contingency eigenvalue for the contingency using the eigenvalues and eigenvectors of the nominal matrix;
perform a time-domain simulation on the contingency if a contingency stability value is greater than a pre-determined threshold value;
adjust a plurality of generation sources or loads or both in the electrical power transmission system based on the results of the time-domain simulation for improving the oscillatory stability;
wherein estimating the contingency eigenvalue comprises using a first-order approximation of a Taylor series expansion when a faster computation is required and using a second-order approximation of a Taylor series expansion when higher accuracy is required; and
wherein when the first-order approximation is used, the contingency eigenvalue is given by $$\lambda_{i(post)}^{1st} \approx \lambda_i + \frac{\psi_i \Delta A_{sys} \phi_i}{\psi_i \phi_i}$$

where $\lambda_{i(post)}^{1st}$ is the contingency eigenvalue, $\lambda_i$, $\phi_i$, and $\psi_i$ are the eigenvalue, right eigenvector, and left eigenvector, respectively, corresponding to mode i and $A_{sys}$ is the nominal matrix.

8. The system in accordance with claim 7, wherein said processor is further programmed to:
calculate a first set of eigenvalues and a first set of eigenvectors for the nominal matrix, each eigenvalue having a real part and an imaginary part, each real part representing a settling time of an oscillation within the electrical power transmission system;
calculate a contingency matrix for the contingency, the contingency matrix including coefficients of a set of ordinary differential equations modeling the electrical power transmission system after the contingency, wherein estimating a contingency eigenvalue for the contingency further comprises using the contingency matrix;
calculate the contingency stability value using the contingency matrix and the nominal matrix, the contingency stability value representing an approximation of the oscillatory stability of the electrical power transmission system after the contingency; and
output the contingency stability value.

9. The system in accordance with claim 8, wherein said processor is further programmed to:
calculate a participation factor for each state of a plurality of states associated with the nominal matrix; and
select a first set of states from the plurality of states based in part on the participation factor of each state, wherein calculating the contingency matrix further comprises perturbating only the first set of states.

10. The system in accordance with claim 8, wherein said processor is further programmed to:
identify a plurality of contingencies;
calculate the contingency stability value for each contingency of the plurality of contingencies, thereby generating a plurality of contingency stability values;
select a subset of contingencies from the plurality of contingencies based at least in part on the plurality of contingency stability values; and
perform the time-domain simulation on each contingency of the subset of contingencies.

11. The system in accordance with claim 10, wherein said processor is further programmed to rank the plurality of contingencies based at least in part on the plurality of contingency stability values, wherein selecting a subset of contingencies further includes screening the plurality of contingencies based at least in part on a pre-defined contingency stability threshold value.

12. One or more computer-readable storage media having computer-executable instructions embodied thereon, wherein when executed by at least one processor, the computer-executable instructions cause the processor to:

receive a plurality of component inputs from a plurality of system components within the electrical power transmission system;
generate a nominal matrix for the electrical power transmission system, wherein the nominal matrix includes a set of equations at least partially modeling the electrical power transmission system;
calculate eigenvalues and eigenvectors of the nominal matrix;
identify a contingency representing a postulated disturbance of the electrical power transmission system;
estimate a contingency eigenvalue for the contingency using the eigenvalues and eigenvectors of the nominal matrix;
perform a time-domain simulation on the contingency if a contingency stability value is greater than a predetermined threshold value;
adjust a plurality of generation sources or loads or both in the electrical power transmission system based on the results of the time-domain simulation for improving the oscillatory stability;
wherein estimating the contingency eigenvalue comprises using a first-order approximation of a Taylor series expansion when a faster computation is required and a second-order approximation of a Taylor series expansion when higher accuracy is required; and
wherein when the first-order approximation is used, the contingency eigenvalue is given by $$\lambda_{i(post)}^{1st} \approx \lambda_i + \frac{\psi_i \Delta A_{sys} \phi_i}{\psi_i \phi_i}$$

where $\lambda_{i(post)}^{1st}$ is the contingency eigenvalue, $\lambda_i$, $\phi_i$, and $\psi_i$ are the eigenvalue, right eigenvector, and left eigenvector, respectively, corresponding to mode i and $A_{sys}$ is the nominal matrix.

13. The computer-readable storage media in accordance with claim 12, wherein the computer-executable instructions further cause the processor to:

calculate a first set of eigenvalues and a first set of eigenvectors for the nominal matrix, each eigenvalue having a real part and an imaginary part, each real part representing a settling time of an oscillation within the electrical power transmission system;
calculate a contingency matrix for the contingency, the contingency matrix including coefficients of a set of ordinary differential equations modeling the electrical power transmission system after the contingency, wherein estimating a contingency eigenvalue for the contingency further comprises using the contingency matrix;
calculate the contingency stability value using the contingency matrix and the nominal matrix, the contingency stability value representing an approximation of the oscillatory stability of the electrical power transmission system after the contingency; and
output the contingency stability value.

14. The computer-readable storage media in accordance with claim 13, wherein the computer-executable instructions further cause the processor to:

calculate a participation factor for each state of a plurality of states associated with the nominal matrix; and
select a first set of states from the plurality of states based at least in part on the participation factor of each state, wherein calculating the contingency matrix further comprises perturbating only the first set of states.

15. The computer-readable storage media in accordance with claim 13, wherein the computer-executable instructions further cause the processor to:

identify a plurality of contingencies;
calculate the contingency stability value for each contingency of the plurality of contingencies, thereby generating a plurality of contingency stability values;
select a subset of contingencies from the plurality of contingencies based at least in part on the plurality of contingency stability values; and
perform the time-domain simulation on each contingency of the subset of contingencies.

\* \* \* \* \*